United States Patent
Berg et al.

(10) Patent No.: US 9,586,541 B2
(45) Date of Patent: Mar. 7, 2017

(54) METHODS, APPARATUS, AND SYSTEMS FOR IDENTIFICATION OF CELLS IN A NETWORK

(71) Applicant: GM GLOBAL TECHNOLOGY OPERATIONS LLC, Detroit, MI (US)

(72) Inventors: Joseph Berg, West Bloomfield, MI (US); Kenneth L. Kaye, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 14/631,628

(22) Filed: Feb. 25, 2015

(65) Prior Publication Data

US 2016/0244002 A1  Aug. 25, 2016

(51) Int. Cl.
*B60R 16/023* (2006.01)
*B60L 11/18* (2006.01)

(52) U.S. Cl.
CPC ............ *B60R 16/023* (2013.01); *B60L 11/18* (2013.01)

(58) Field of Classification Search
CPC ... B60L 2240/547; B60L 11/18; B60R 16/023
See application file for complete search history.

(56) References Cited

U.S. PATENT DOCUMENTS

| 2002/0018922 | A1* | 2/2002 | Fuglevand | ........ H01M 8/04007 429/429 |
| 2015/0104673 | A1* | 4/2015 | de Greef | ............... H04L 12/437 429/7 |

FOREIGN PATENT DOCUMENTS

JP          2015033952 A  * 2/2015

* cited by examiner

*Primary Examiner* — Yuen Wong
(74) *Attorney, Agent, or Firm* — Phillips Ryther & Winchester; Matthew D. Thayne (57) ABSTRACT

Methods and systems for identification of slave elements and/or cells in a communication system within a vehicle. In some implementations, such methods may comprise measuring a first voltage of a first slave device of a plurality of slave devices within the communication system, and measuring a second voltage of a second slave device of the plurality of slave devices within the communication system. A location of at least the first and second slave devices, which may be linked with respective cells, such as battery cells or fuel cells, may then be identified by comparing at least the first voltage with the second voltage.

7 Claims, 5 Drawing Sheets

METHODS, APPARATUS, AND SYSTEMS FOR IDENTIFICATION OF CELLS IN A NETWORK

TECHNICAL FIELD

This disclosure relates to identification of slave devices in a network. For example, in some embodiments and implementations, this disclosure relates to methods, apparatus, and systems for identification of cells in a vehicle propulsion system by use of a master-slave network within a vehicle.

BACKGROUND

Identification of particular cells within a fuel cell, electric, or hybrid electric vehicle may be desirable for a number of reasons. For example, it may be useful to be able to poll such cells individually to obtain certain information, such as cell voltages, state of charge ("SOC"), state of health ("SOH"), temperature, capacity, resistance, current, etc.

Currently, certain communication standards may allow for hard-coded identification methods (value set in device software). However, such methods typically require unique software and part numbers for each device on the communication network. Other communication standards do not allow for unique identification of slave devices and depend on broadcast communication methods, which may not allow for unique determination of information about each of the slave devices.

The present inventors have therefore determined that it would be desirable to provide methods, apparatus, and systems for identification of slave devices in a network, such as a master-slave network associated with fuel and/or battery cells within a vehicle, that overcome one or more of the foregoing limitations and/or other limitations of the prior art.

SUMMARY

Methods, apparatus, and systems are disclosed herein for allowing identification of cells, such as battery cells and/or fuel cells in a vehicle. In some embodiments, such identification may take place by linking each of a plurality of slave devices in a communication network to a separate cell and then identifying a location of the slave devices. This may be used to allow a vehicle to obtain unique information from each of the individual cells, in some embodiments without having to use unique software and/or part numbers for each slave device.

In some embodiments, a resistor divider network may be used. In some such embodiments, the voltage may be measured at the slave devices on the network in between two adjacent resistors associated with each slave device. Because this voltage will vary from device to device in a known fashion, an algorithm may be used to determine their unique identity, which may allow for a master device to poll each device uniquely on the network for dimensional/locational data (e.g., cell voltage and the like).

In some embodiments and implementations, the slave devices may comprise circuit cards having a common part number, which may reduce costs and ease the tracking of parts. With respect to embodiments used in connection with fuel cell vehicles, the cell voltage monitor ("CVM") or other master device in the network may be used to diagnose the network for faults, along with allowing the CVM/master to obtain locational information regarding the cells in the stack, which may be used to obtain particularized information, such as cell voltages, within each cell in the stack/network.

With respect to embodiments used in connection with vehicles utilizing high-voltage batteries for propulsion, various embodiments and implementations disclosed herein may be used to provide a method for identification of battery cells utilizing simpler and/or less expensive circuit cards or other equipment. For example, in some embodiments, custom circuit components may not be required, or at least the use of such components may be reduced.

In a more particular example of a method for identification of slave elements in a polled communication system within a vehicle, the method may comprise measuring a first voltage of a first slave device of a plurality of slave devices within the polled communication system and measuring a second voltage of a second slave device of the plurality of slave devices within the polled communication system. In some such implementations, the step of measuring a first voltage and a second voltage may comprise the first and second slave devices each measuring their own voltages internally to allow for self-identification of the slave devices. Any number of slave devices may be used and a voltage of each of the various slave devices may be measured in some implementations.

In a more particular example of identification of slave elements within a polled communication system within a vehicle network, the method may comprise a means of implementation of a request from the network master for all devices within the plurality of devices of the network to self-identify their respective location within the plurality of devices of the network.

Some implementations may further comprise polling at least one of the first and second slave devices independent of the other of the first and second slave devices for information unique to the polled slave device. In some such implementations, the step of polling at least one of the first and second slave devices independent of the other of the first and second slave devices for information unique to the polled slave device may comprise polling at least one of the first and second slave devices independent of the other of the first and second slave devices for a voltage of a cell associated with the polling of at least one of the first and second slave devices.

In some implementations, the step of measuring a first voltage of a first slave device of a plurality of slave devices may comprise measuring the first voltage between two adjacent resistors of the first slave device. Similarly, the step of measuring a second voltage of the second slave device may comprise measuring the second voltage between two adjacent resistors of the second slave device (and so on for implementations comprising a greater number of slave devices).

In a specific example of a method for identification of slave elements in a resistor divider network within a vehicle, the method may comprise measuring a plurality of voltages of a plurality of slave devices within the resistor divider network between two adjacent resistors of each of the plurality of slave devices and using an expected relationship between the plurality of voltages to identify a location of each of the plurality of slave devices. In some implementations, the voltages may be measured by each of the slave devices themselves.

Some implementations may further comprise polling at least one of the plurality of slave devices independent of the other slave devices for information unique to the at least one of the plurality of slave devices. In some implementations, the voltage measurements may take place by allowing each of the slave devices to undertake self-identification by measuring the voltage at the center node of two resistors on each respective slave device and using these voltages in an algorithm with information broadcast from the master device to identify the respective locations of the slave devices, and thus the corresponding cell or cells associated with each slave device, uniquely within a plurality of slave devices on the network.

In some implementations, the location may comprise a physical location. In some such implementations, the location may comprise a location relative to other slave devices within the resistor divider network.

In some implementations, the step of polling at least one of the plurality of slave devices independent of the other slave devices for information unique to the at least one of the plurality of slave devices may comprise polling at least one of the plurality of slave devices independent of the other slave devices for a voltage of a cell associated with the at least one of the plurality of slave devices.

The cell may comprise at least one of a voltage of a cell of a fuel cell stack associated with the at least one of the plurality of slave devices and a voltage of a cell of a battery associated with the at least one of the plurality of slave devices.

In a particular example of a system for identification of cells associated with slave elements in a network within a vehicle a master device of the network and a plurality of slave devices of the network. The master device may be configured to communicate with each of the plurality of slave devices over the network. The system may further comprise a vehicle propulsion system comprising a plurality of cells, wherein each of the cells is associated with a separate slave device of the plurality of slave devices. The master device may be configured to receive an indication of a location of each of the plurality of cells within the vehicle propulsion system derived from a measurement of a voltage of each of the plurality of slave devices and an expected relationship between the voltages of each of the plurality of slave devices.

In some embodiments, one or more (in some cases, all) of the slave devices may be configured to take voltage measurements internally, such as between two adjacent resistors, for example. Such voltage measurements may be used, in some embodiments along with information received from the master device, to allow for identification of the location of each of the slave devices within the network.

In some embodiments, the vehicle may comprise a fuel cell vehicle. In some such embodiments, the plurality of cells may comprise a plurality of fuel cells within a fuel cell stack of the vehicle. In some embodiments, the master device may comprise a cell voltage monitor of a fuel cell system of the vehicle.

In some embodiments, the vehicle may comprise at least one of an electric vehicle and a hybrid electric vehicle, and wherein the plurality of cells comprises a plurality of battery cells of a high voltage battery system.

In some embodiments, the network may comprise a resistor divider network. In some such embodiments, each of the plurality of slave devices may comprise a pair of adjacent resistors, and the system may be configured to measure a voltage of each of the plurality of slave devices by measuring the voltage between the pair of adjacent resistors of each of the plurality of slave devices.

The master device may be configured to use the indication of a location of each of the plurality of cells to poll each of the plurality of slave devices independently for cell data associated with each of the cells. The cell data may comprise, for example, cell voltage data.

The features, structures, steps, or characteristics disclosed herein in connection with one embodiment may be combined in any suitable manner in one or more alternative embodiments.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

A detailed description of apparatus, systems, and methods consistent with various embodiments of the present disclosure is provided below. While several embodiments are described, it should be understood that disclosure is not limited to any of the specific embodiments disclosed, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

The embodiments of the disclosure will be best understood by reference to the drawings, wherein like parts may be designated by like numerals. It will be readily understood that the components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified.

Embodiments of the systems, apparatus, and methods disclosed herein may be used to allow for multiple devices in a communication network to self-identify, which may, when coupled with a plurality of fuel and/or battery cells within a vehicle, allow the vehicle to obtain unique information from each of the individual cells, in some embodiments without having to use unique software and/or part numbers for each slave device. In some embodiments, a resistor divider network may be used. In some such embodiments, the voltage may be measured at the slave devices on the network in between two adjacent resistors associated with each slave device. Because this voltage will vary from device to device in a known fashion, an algorithm may be used to determine their unique identity, which may allow for a master device, such as a cell voltage monitor ("CVM") to poll each device uniquely on the network for dimensional/locational data (e.g., cell voltage and the like).

In some embodiments and implementations, the slave devices may comprise circuit cards having a common part number, which may reduce costs and ease the tracking of parts. With respect to embodiments used in connection with fuel cell vehicles, the CVM or other master device in the network may be used to diagnose the network for faults, along with allowing the CVM/master to obtain locational information regarding the cells in the stack, which may be used to obtain particularized information, such as cell voltages, within each cell in the stack. With respect to embodiments used in connection with vehicles utilizing high-voltage batteries for propulsion, various embodiments and implementations disclosed herein may be used to provide a method for identification of battery cells utilizing simpler and/or less expensive circuit cards or other equipment. For example, in some embodiments, custom circuit components may not be required, or at least the use of such components may be reduced.

Figure 1:
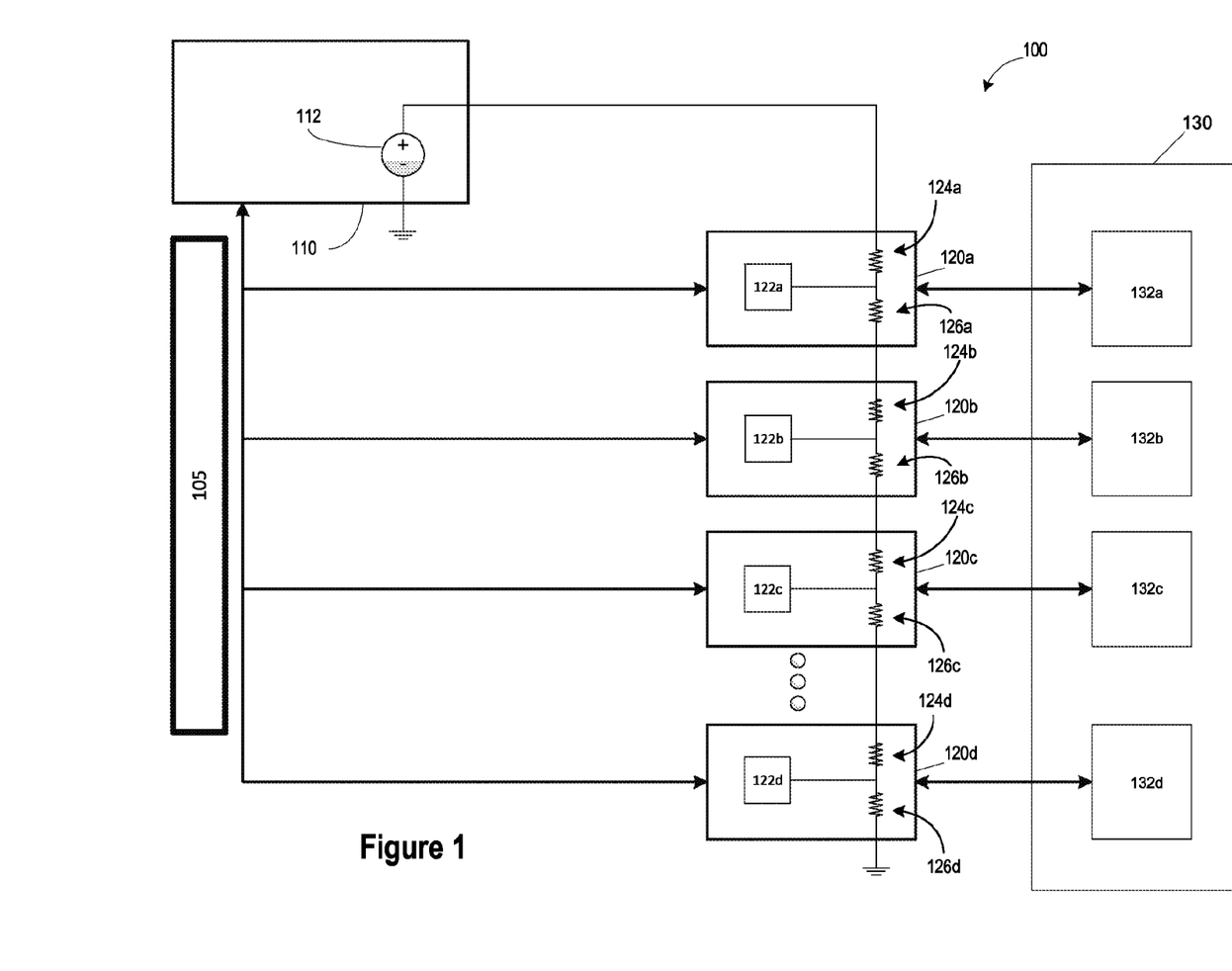
FIG. 1 is a schematic diagram illustrating an example of a system for identification of slave devices in a communication network within a vehicle according to one embodiment.

Additional details of certain embodiments and implementations will now be discussed in greater detail in connection with the accompanying figures. FIG. 1 depicts a schematic diagram of an embodiment of a system 100 for identification of slave devices in a communications network within a vehicle. System 100 comprises a master device 110 and a plurality of slave devices 120. The master device 110 may comprise, for example, a cell voltage monitor, in embodiments used in connection with a fuel cell stack. Master device 100 may be coupled with a controller and/or other components of a vehicle to allow information, such as cell information from fuel or battery cells associated with each of the respective slave devices 120, to be used by the vehicle to diagnose problems, control the fuel cell stack and/or battery, or otherwise facilitate desired operation of the vehicle.

Each of the various slave devices 120 is coupled to master device 110 by way of a communications network 105. Communications network 105 may comprise, for example, an Inter-Integrated Circuit (I²C) network, a Serial Peripheral Interface (SPI) network, a Controller Area Network (CAN), or any other communications network available to those of ordinary skill in the art. Communications network 105 is preferably a wired network, although the system may be used with various wireless communication schemes. In addition, as also illustrated in FIG. 1, in some embodiments, each of the various slave devices 120 may be physically coupled with master device 110 via wiring 108 to allow for a voltage 112 from master device 110 to be passed along to each of the slave devices 120 in between adjacent resistors within each slave device in a resistor divider network. Although for simplicity only four slave devices (120a, 120b, 120c, and 120d) are depicted in FIG. 1, those of ordinary skill in the art will appreciate that a wide variety of other numbers of slave devices 120 may be used. However, the measurement capability and/or accuracy of the slave devices may dictate a limit to the preferred number of slave devices 120 in the network 105. As discussed below, in certain preferred embodiments, the number of slave devices 120 will correspond with the number of cells in a fuel cell stack and/or the number of battery cells in a battery pack used in a vehicle propulsion system.

Thus, as also shown in FIG. 1, each of the slave devices is coupled with a corresponding cell (or group of cells) 132, which, as mentioned above, may comprise a cell (or group of cells) of a fuel cell stack or may comprise a battery cell (or group of battery cells) of a battery pack. Cell 132a is therefore coupled with slave device 120a, cell 132b is coupled with slave device 120b, and so on. Cells 132 are shown in FIG. 1 as being part of vehicle propulsion system 130. A battery pack and/or fuel cell stack containing cells 132 may be part of vehicle propulsion system 130.

Each of the various slave devices 120 may comprise a processor 122, a first resistor 124, and a second resistor 126. A voltage measurement may be taken at each slave device 120 in between the adjacent first and second resistors 124/126. This voltage measurement may be used in identifying the location of each slave device 120 within the network, as described in greater detail below. For example, in a resistor divider network, the voltage measured in between adjacent resistors 124/126 on each slave device 120 may vary in a known fashion. Thus, one or more algorithms may be used to determine the location of each slave device 120 by comparing the master identification voltage 112 with the measured voltage at each slave device 120. Once the master device 110 has identified the location of each slave device 120, the master device 110 can poll each slave device 120 individually for cell information (such as cell voltage, for example) without having to use unique software and/or part numbers for each slave device 120.

Figure 2:
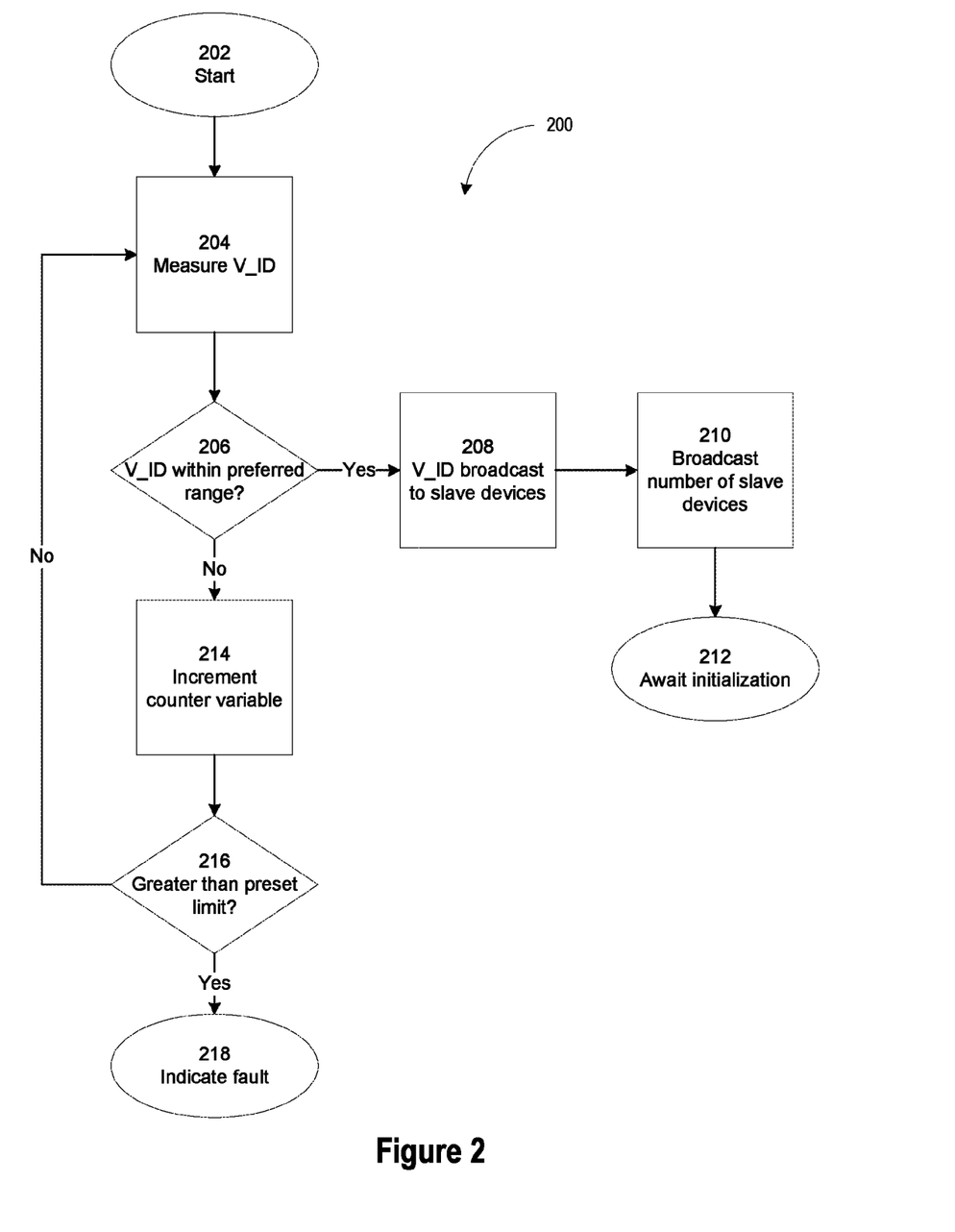
FIG. 2 is a flow chart illustrating an example of a method for initializing a master device within a master/slave communication network according to one implementation.

FIG. 2 is a flow chart illustrating an example of a method 200 for initializing a master device, such as master device 110, within a communications network. At step 202, the master device initialization process may begin, after which a master identification voltage (V_ID) may be measured or otherwise obtained at step 204. After obtaining the master identification voltage, an inquiry may be made at step 206 to determine whether the voltage V_ID is within a predefined range or otherwise within certain predefined limits. If the voltage V_ID is within the predefined limits, the master voltage V_ID may be broadcast or otherwise transmitted on the network to the slave devices at step 208. A number, or an expected number, of slave devices on the network (N) may also be broadcast to one or more of the slave devices on the network at step 210, after which method 200 may await initialization of the slave devices at step 212.

If the voltage V_ID is not within the predefined limits, a counter variable may be incremented at step 214. A determination may then be made at step 216 as to whether the counter variable is greater than a preset limit. If so, a fault may be indicated at step 218. If not, method 200 may revert to step 204.

Figure 3:
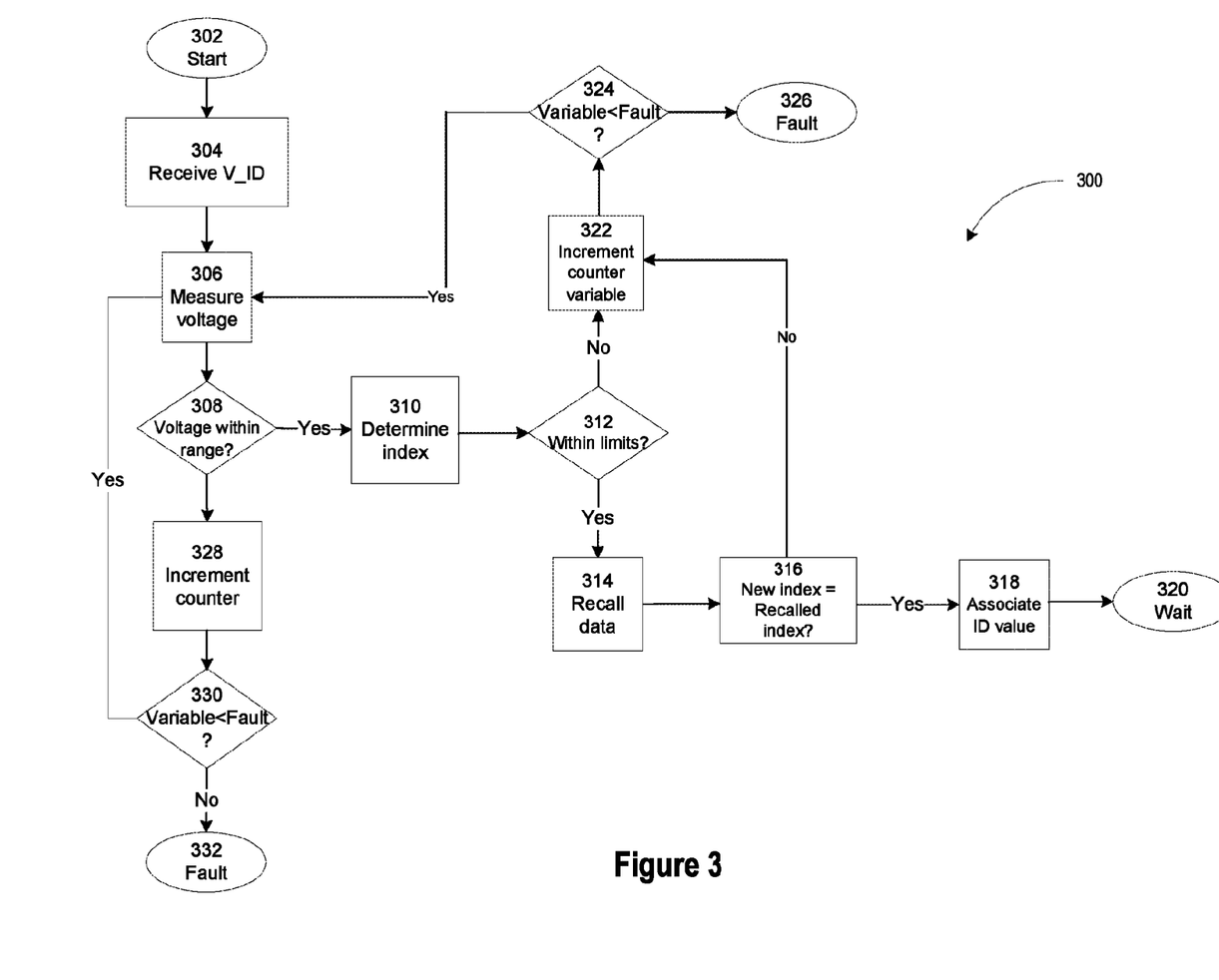
FIG. 3 is a flow chart illustrating an example of a method for initializing slave devices within a master/slave communication network according to one implementation.

FIG. 3 is a flow chart illustrating an example of a method 300 for initializing the slave devices, such as slave devices 120, within a master/slave communications network. At step 302, the slave device initialization process begins, after which the number or expected number of slave devices (N), along with the master voltage V_ID, may be received from the master device at step 304. At step 306, a voltage associated with one of the slave devices ($V_i$) may be measured. As previously mentioned, in certain preferred implementations, this voltage may be measured in between adjacent resistors in a resistor divider network.

Following step 306, method 300 may proceed to step 308 at which point a determination may be made as to whether the voltage measured in step 306 ($V_i$) is within a predefined range or otherwise within predefined limits. If voltage $V_i$ is within these limits, the index (i), which identifies the location of the slave device from which voltage $V_i$ was measured, and thereby identifies the location of the particular cell associated with this slave device, may be determined at step 310. In some implementations, the index (i) may be obtained as follows:

$$i = \frac{N}{V_{ID}} * (V_{ID} - V_i) + \frac{1}{2}$$

After the index of a particular slave device has been identified, a determination may be made as to whether the index (i) is within certain predefined limits at step 312. If the index (i) is within these limits, a stored index data set may be recalled from memory at step 314. In some implementations, step 314 may comprise recalling a stored index data set from a non-volatile memory source. Following step 314, a determination may be made at step 316 as to whether the new index (i) calculated at step 310 is equal to the recalled index data set obtained during step 314.

If the new index (i) calculated at step 310 is equal to the recalled index data set obtained during step 314, a pre-programmed ID value, such as a value identifying a particular cell of a battery pack or fuel cell stack in a vehicle, may be associated with the new index (i) at step 318. Method 300 may then proceed to step 320, at which point the slave device may await communication, such as polling, from the master device. In some implementations, the master device may then poll the slave device for unique cell information, such as a voltage associated with the particular cell associated with the slave device.

If, at step 312, the index (i) is outside of the predefined limits, the process may instead proceed to step 322, at which point a counter variable (k) may be incremented. Similarly, if, at step 316, it is determined that the new index (i) calculated at step 310 is not equal to the recalled index data set obtained during step 314, then the process may proceed directly to step 322 from step 316.

Following step 322, a determination may be made at step 324 as to whether the counter variable (k) is less than a preset fault value. If the counter variable (k) is greater than or equal to the fault value, a fault may be indicated at step 326, which may be programmed to result in termination or ignoring of communications, or certain types of communications, such as polled messages, from the master device. If the counter variable (k) is less than the fault value, then process 300 may proceed from step 324 back to step 306 for an additional voltage measurement.

If step 308 results in a determination that the voltage measured in step 306 is outside of the predefined limit(s), then instead of proceeding to step 310, process 300 may instead proceed to step 328. Step 328 may comprise incrementing another counter variable (j). Following step 328, a determination may be made at step 330 as to whether the counter variable (j) is less than a fault value. If the counter variable (j) is greater than or equal to the fault value, a fault may be indicated at step 332. If the counter variable (j) is less than the fault value, the process 300 may proceed from step 328 back to step 306 for an additional voltage measurement.

Figure 4:
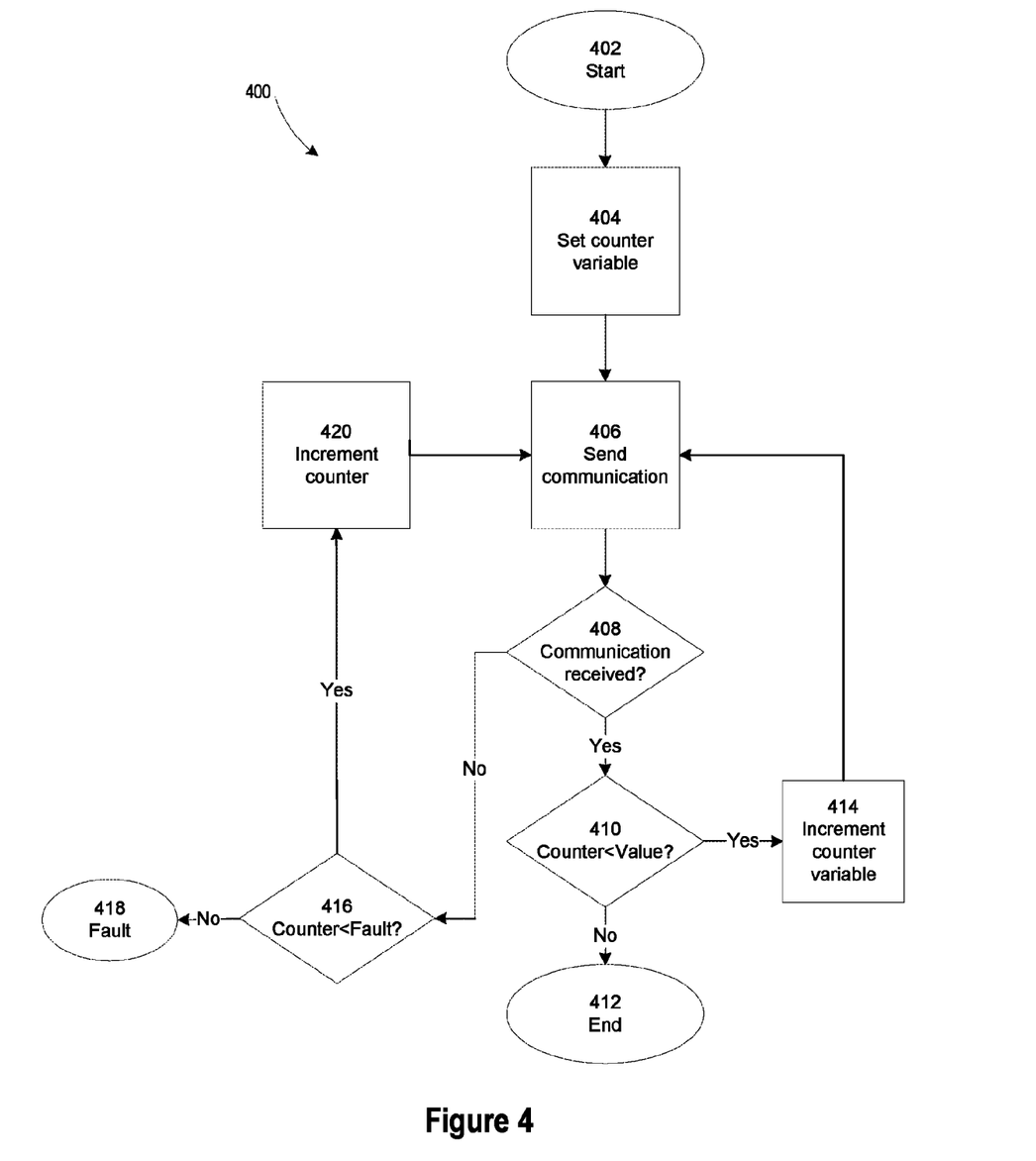
FIG. 4 is a flow chart illustrating an example of a method for polling slave devices in a master/slave communication network according to one implementation.

FIG. 4 is a flow chart illustrating an example of a method 400 for communicating, such as sending polling messages, between the master device and the slave devices of a master/slave communications network. At step 402, the communication process may begin, after which a counter variable may be set to a predetermined value, such as 1, in step 404. In some implementations, this counter variable may be linked to a particular device, such as a first slave device in the network, and may thereby indirectly reference a first cell in a battery pack or fuel cell of a vehicle propulsion system within a vehicle.

At step 406, a poll, message, or other communication may then be sent to the slave device corresponding to the variable set in step 404. In other words, a first of N slave devices may be identified as device "1" and a communication may be sent to a cell associated with this particular device in step 406. In some implementations, this communication may be sent directly to the particular cell associated with the slave device. Alternatively, the communication may be sent to the slave device itself, which slave device may then use the communication to obtain information from the associated cell. In some implementations, the communication may comprise a poll for information unique to the polled slave device, such as a voltage of a particular cell associated with the polled slave device.

Following step 406, a determination may be made at step 408 as to whether the communication was received by the slave device and/or cell associated with the slave device. If confirmation of receipt of this message, poll, or other communication is obtained, process 400 may proceed to step 410 at which point a determination may be made as to whether the counter variable is less than a predetermined value, such as N (the total number of slave devices in the network). If the counter variable is not less than N, or not less than another predetermined value, then the communication routine may terminate at 412, or may restart at 402, as directed by a master control program.

If the counter variable is less than N, or less than another predetermined value, then the process may proceed to step 414 at which point the counter variable may be incremented. After incrementing the counter variable (typically by one) the process may return to step 406 for polling another slave device and/or associated cell, or otherwise communicating with such slave device and/or associated cell.

If, at step 408, confirmation of receipt of the message, poll, or other communication from step 406 cannot be confirmed, process 400 may proceed from step 408 to step 416. Step 416 may comprise determining whether the value of a fault counter is less than a predetermined fault value. If it is determined that the value of the fault counter is not less than the fault value, then a fault may be indicated at step 418. If it is determined that the value of the fault counter is less than the fault value, then the fault counter may be incremented at step 420. In some implementations, step 420 may further comprise applying a delay period before proceeding. In some such implementations, the delay period may comprise a predetermined time period. Alternatively, the delay period may fluctuate based upon other variables such as, for example, the number of communication attempts in a given operation session or time period. Following step 420, another communication/polling attempt may be made at step 406.

Figure 5:
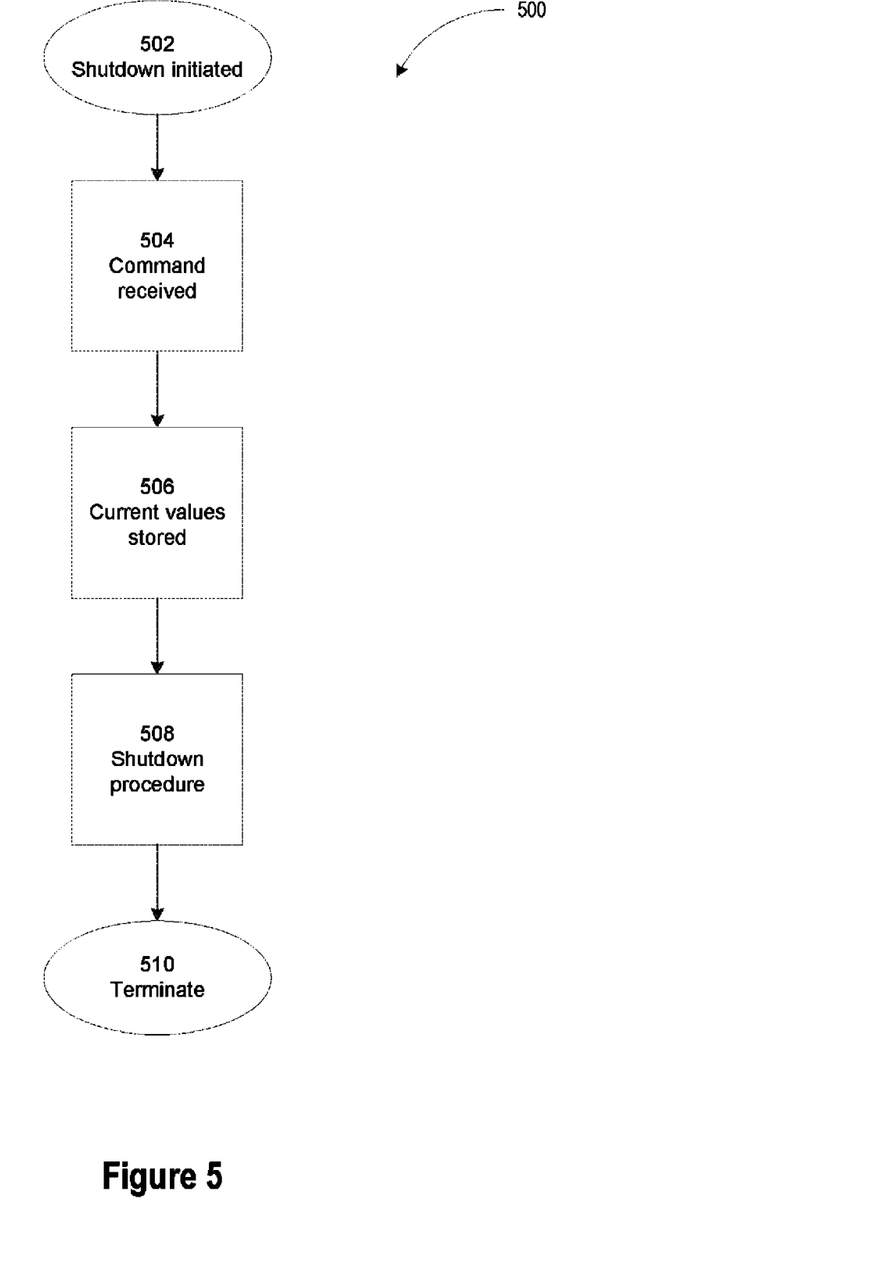
FIG. 5 is a flow chart illustrating an example of a method for a shutdown procedure for a slave device in a master/slave communication system according to one implementation.

FIG. 5 is a flow chart illustrating an example of a method 500 for a shutdown procedure for a slave device in a master/slave communications system. At step 502, the slave shutdown process is initiated. A shutdown command is received at step 504. Such a command may be received, for example, by a user, such as a driver or vehicle technician. Alternatively, the shutdown command may be automatically generated by the system, or by a related system of a vehicle. For example, a shutdown command may be automatically generated each time a vehicle is keyed off and/or one or more vehicle systems are being shut down.

At step 506, a current ID value and a current index variable value (i) may be stored, preferably to a non-volatile memory. The slave may then be allowed to proceed with a standard shutdown procedure at step 508. The shutdown procedure may then terminate at step 510.

The foregoing specification has been described with reference to various embodiments and implementations. However, one of ordinary skill in the art will appreciate that various modifications and changes can be made without departing from the scope of the present disclosure. For example, various operational steps, as well as components for carrying out operational steps, may be implemented in alternate ways depending upon the particular application or in consideration of any number of cost functions associated with the operation of the system. Accordingly, any one or more of the steps may be deleted, modified, or combined with other steps. Further, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced, are not to be construed as a critical, a required, or an essential feature or element.

Those having skill in the art will appreciate that many changes may be made to the details of the above-described embodiments without departing from the underlying principles of the invention. The scope of the present invention should, therefore, be determined only by the following claims.

The invention claimed is:

1. A method for identification of slave elements in a polled communication system within a vehicle, the method comprising steps of:
    measuring a master identification voltage of a master device within the polled communication system;
    measuring a first voltage of a first slave device of a plurality of slave devices within the polled communication system, wherein each of the plurality of slave devices comprises a processor;
    measuring a second voltage of a second slave device of the plurality of slave devices within the polled communication system;
    sending the first voltage to the master device; sending the second voltage to the master device;
    determining a location of at least the first and second slave devices within the polled communication system by comparing the first voltage with the master identification voltage and by comparing the second voltage with the master identification voltage at least the first voltage with the second voltage, wherein each of the plurality of slave devices is associated with one of a plurality of cells of a vehicle propulsion system of the vehicle; and
    identifying, by the master device, each of the plurality of slave devices in the polled communication system within the vehicle.

2. The method of claim 1, wherein the vehicle comprises a fuel cell vehicle, and wherein each of the plurality of cells comprises a fuel cell within a fuel cell stack of the vehicle.

3. The method of claim 1, wherein the vehicle comprises at least one of an electric vehicle and a hybrid electric vehicle, and wherein each of the plurality of cells comprises a battery cell of a high voltage battery system of the vehicle.

4. The method of claim 1, further comprising polling at least one of the first and second slave devices independent of the other of the first and second slave devices for information unique to the polled slave device.

5. The method of claim 4, wherein the step of polling at least one of the first and second slave devices independent of the other of the first and second slave devices for information unique to the polled slave device comprises polling at least one of the first and second slave devices independent of the other of the first and second slave devices for a voltage of a cell associated with the polling of at least one of the first and second slave devices.

6. The method of claim 1, wherein the step of measuring a first voltage of a first slave device of a plurality of slave devices comprises measuring the first voltage between two adjacent resistors of the first slave device.

7. The method of claim 1, wherein the step of measuring a first voltage of a first slave device of a plurality of slave devices comprises using the first slave device to measure the first voltage.

* * * * *